(12) United States Patent
Wang

(10) Patent No.: US 6,847,141 B2
(45) Date of Patent: Jan. 25, 2005

(54) METAL BUSHING MOTOR TO FIX IN A FAN

(75) Inventor: Fu-Yin Wang, Taipei (TW)

(73) Assignee: Datech Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 10/680,301

(22) Filed: Oct. 8, 2003

(65) Prior Publication Data

US 2004/0145262 A1 Jul. 29, 2004

(30) Foreign Application Priority Data

Jan. 27, 2003 (TW) ........................... 92201459 U

(51) Int. Cl.$^7$ ..................... H02K 5/00; H02K 11/00; H02K 7/00
(52) U.S. Cl. ........................ 310/91; 310/67 R
(58) Field of Search .................. 310/67 R, 90, 310/254, DIG. 6, 261, 267, 217, 91

(56) References Cited

U.S. PATENT DOCUMENTS

| | | | | |
|---|---|---|---|---|
| 4,783,608 A | * | 11/1988 | Gruber et al. ............... | 310/90 |
| 5,245,236 A | * | 9/1993 | Horng ....................... | 310/67 R |
| 5,343,104 A | * | 8/1994 | Takahashi et al. .......... | 310/90 |
| 5,363,003 A | * | 11/1994 | Harada et al. ............. | 310/67 R |
| 5,610,462 A | * | 3/1997 | Takahashi ................... | 310/91 |
| 6,084,328 A | * | 7/2000 | Yamashita et al. .......... | 310/90 |
| 6,102,675 A | * | 8/2000 | Hsieh ....................... | 417/423.13 |
| 6,107,717 A | * | 8/2000 | Lin et al. ................... | 310/90 |
| 6,137,197 A | * | 10/2000 | Taniguchi et al. .......... | 310/67 R |
| 6,144,135 A | * | 11/2000 | Ho ........................... | 310/254 |
| 6,183,221 B1 | * | 2/2001 | Hsieh ....................... | 417/423.12 |
| 6,309,191 B1 | * | 10/2001 | Hu .......................... | 417/423.12 |
| 6,320,291 B1 | * | 11/2001 | Lin et al. ................... | 310/91 |
| 6,376,946 B1 | * | 4/2002 | Lee .......................... | 310/67 R |
| 6,379,129 B1 | * | 4/2002 | Obara ....................... | 417/423.12 |
| 6,400,054 B1 | * | 6/2002 | Horng ....................... | 310/91 |
| 6,498,412 B2 | * | 12/2002 | Horng ....................... | 310/91 |
| 6,511,303 B2 | * | 1/2003 | Obara ....................... | 417/423.12 |
| 6,538,355 B1 | * | 3/2003 | Horng et al. ............... | 310/91 |
| 6,654,213 B2 | * | 11/2003 | Horng et al. ............... | 361/23 |
| 6,700,257 B2 | * | 3/2004 | Lin ........................... | 310/90 |

FOREIGN PATENT DOCUMENTS

| | | |
|---|---|---|
| TW | 221590 | 8/1982 |
| TW | 223374 | 12/1982 |
| TW | 236471 | 1/1983 |

* cited by examiner

*Primary Examiner*—Burton S. Mullins
*Assistant Examiner*—Heba Y. Elkassabgi
(74) *Attorney, Agent, or Firm*—Troxell Law Office PLLC

(57) ABSTRACT

The present invention provides a metal bushing motor to fix a fan. The fan includes a frame body, a circuit board disposed on the frame body, a stator assembly mounted on the frame body, and a rotor assembly set on the outside of the stator assembly. A loading base is disposed in the center of the frame body and a bearing is disposed on the base. The bearing on the loading base is composed of a connection part and a hollow tube. At least one joint part is disposed on outer circumference of the connection part. A lower bobbin is mounted on the button of the stator assembly. A hole is in the center of the lower bobbin and at least one obstructer corresponding to the joint part mounted on the bearing is disposed on inner circumference of the hole. By the lower bobbin, the stator assembly is firmly mounted on the bearing of the base, rather than get loose or fall off to interrupt the rotation operation of the fan while being forced or operated for a certain period.

6 Claims, 4 Drawing Sheets

METAL BUSHING MOTOR TO FIX IN A FAN

FIELD OF THE INVENTION

The present invention relates to a metal bushing motor to fix in a fan and particularly to a method for the stator assembly steadily installed on a bearing of the base by the means of a lower bobbin without failure the rotation of the fan motor when loosen or detached by force or after a period of usage.

BACKGROUND OF THE INVENTION

The conventional stator assembly of a cooling fan, disclosed in the Taiwan Patent No. 221590, includes a chassis with a base thereof, containing a room; a circuit board disposed in the room of the chassis with several positioning holes set on some appropriate places of it; a coil base wound with coil, also disposed in the room of the chassis adjacent to the circuit board; a position device set on the coil base; which is characterized in that:

Several identical position holes are disposed on the base of the chassis corresponding to the position holes of the circuit board. Several position bars are disposed on one side of the position device adjacent to the circuit board for sequentially placing the position bars in the position holes of the base and the position holes of the circuit board.

The small stator assembly of a cooling fan, disclosed in the Taiwan Patent No. 236471, includes a stator assembly coil, upper and lower magnetic poles, a circuit board, and a case, which is characterized in that:

A metal tube with a specific outside diameter passes through the stator assembly coil, upper and lower magnetic poles, and the center of the circuit board. The button of the metal tube is pressed in the hole of the center of the case.

The small stator assembly of a cooling fan, disclosed in the Taiwan Patent No. 223374, includes a stator assembly coil, upper and lower magnetic poles, a circuit board, and a case, which is characterized in that:

Circular lip with a larger outside diameter is disposed on the top of the metal tube with a single outside diameter. The diameter of the circular lip is larger than the inside diameter of the central hole of the upper and lower magnetic poles and the stator assembly coil. The outside diameter of the metal tube is slightly larger than the inside diameter of the central hole of the upper and lower magnetic poles and the circuit board, and is a little bit smaller than the inside diameter of the central hole of the stator assembly coil. The button of the metal tube presses through the upper magnetic pole, the stator assembly coil, and the lower magnetic pole. The stator assembly coil chipped tightly in the outside diameter of the lower part of the circular lip of the metal tube. Then, by the central hole of the circuit board, the circuit board is pressed to form a combined stator assembly outside the case, which will be moved into the case later. Since the outside diameter of the metal tube is slightly larger than the inside diameter of the central hole of the case, the metal tube is forced into the inside diameter of the central bar of the case, so that the whole stator assembly will be firmly mounted in the case.

Although all of the above methods can mount the stator assembly on the outside frame body of the fan, in the stator assembly of a cooling fan disclosed in Taiwan Patent No. 221590, the position bar must cooperate with the position hole. Since the position bar is very small, it might be broken by extra force during fabrication or storage process.

In the small stator assembly of a cooling fan, disclosed in Taiwan Patent No. 236471 and No. 223374, the stator assembly coil presses the metal tube so as to position the stator assembly. Thus, after a certain time, the metal tube and the stator assembly will get loose or fall off to interrupt the rotation operation of the fan due to the metal characteristic of elements. Therefore, it is apparent that the above conventional structure is insufficient for real practice.

SUMMARY OF THE INVENTION

The main objective of the present invention is by a lower bobbin, to let a stator assembly be firmly mounted on a bearing of a base, rather than get loose or fall off to interrupt the rotation operation of the fan while being forced or operated for a certain period.

To achieve the above objective, a metal bushing motor to fix a fan is provided, which includes a frame body body, wherein a base is disposed in the center of the frame body and a bearing is disposed on the base; a circuit board disposed on the base of the frame body; a stator assembly, composed of a silicon steel assembly, an upper bobbin and a lower bobbin disposed on two sides of the silicon steel assembly, wherein by a bore disposed in the center of the silicon steel assembly, the stator assembly disposed on the outside of the bearing on the base electronically connects to the circuit board; a rotor assembly, composed of a blade, a magnetic lasso circularly disposed on the inside the blade, and an axis pivoted on the center of the blade, wherein by the axis, the rotor assembly is set on the outside of the bearing on the base and the magnetic lasso corresponds to the outside of the silicon steel assembly; which is characterized in that:

The bearing on the base is composed of a connection part and a hollow tube, and at least one joint part is disposed on outer circumference of the connection part; and A hole corresponding to the bore in the center of the silicon steel assembly is disposed in the center of the lower bobbin of the stator assembly, and at least one obstructer corresponding to the joint part mounted on the bearing is disposed on inner circumference of the hole. By the lower bobbin, the stator assembly is firmly mounted on the bearing of the base, rather than get loose or fall off to interrupt the rotation operation of the fan while being forced or operated for a certain period.

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

The following descriptions of the preferred embodiments are provided to understand the features and the structures of the present invention.

Figure 1:
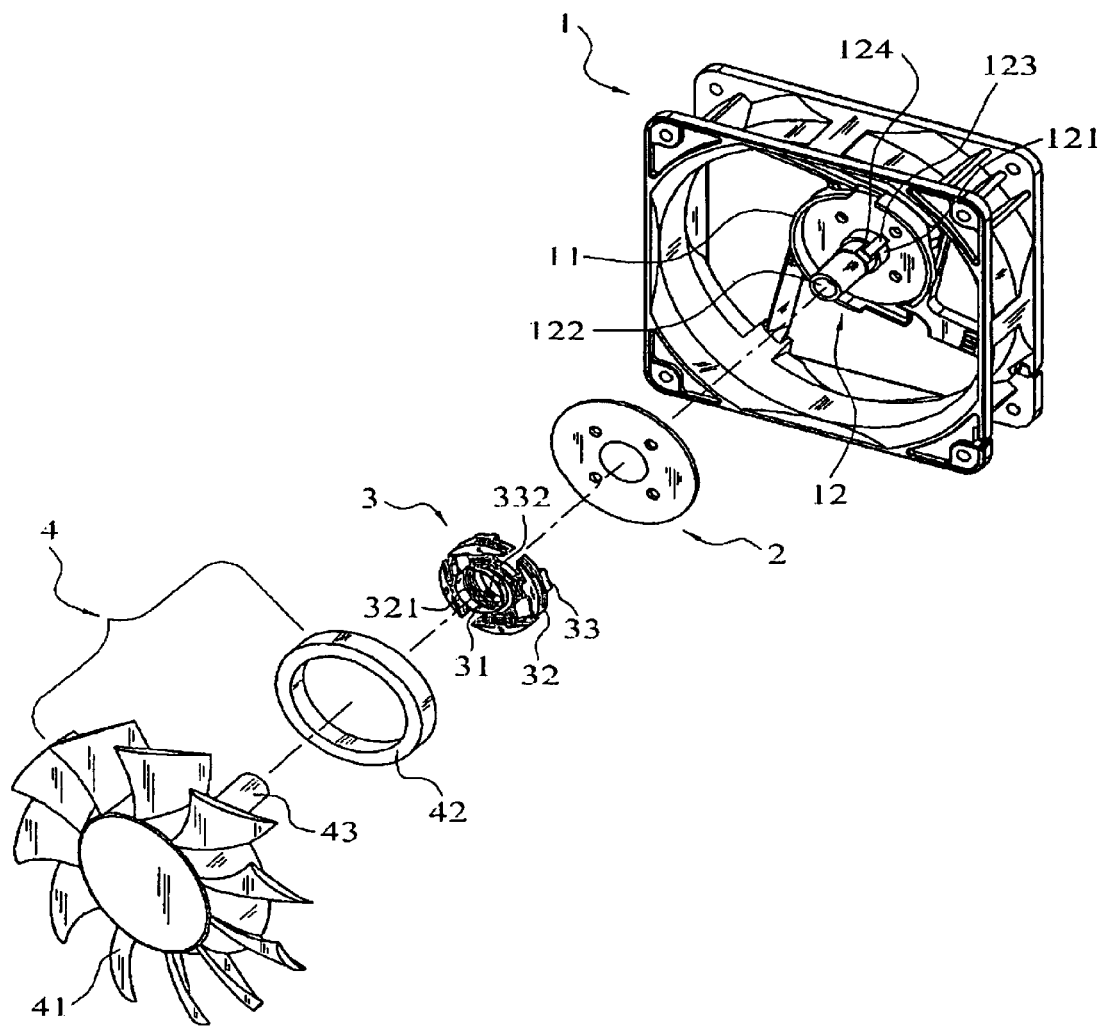
FIG. 1 shows a separation view of the present invention.
Figure 2:
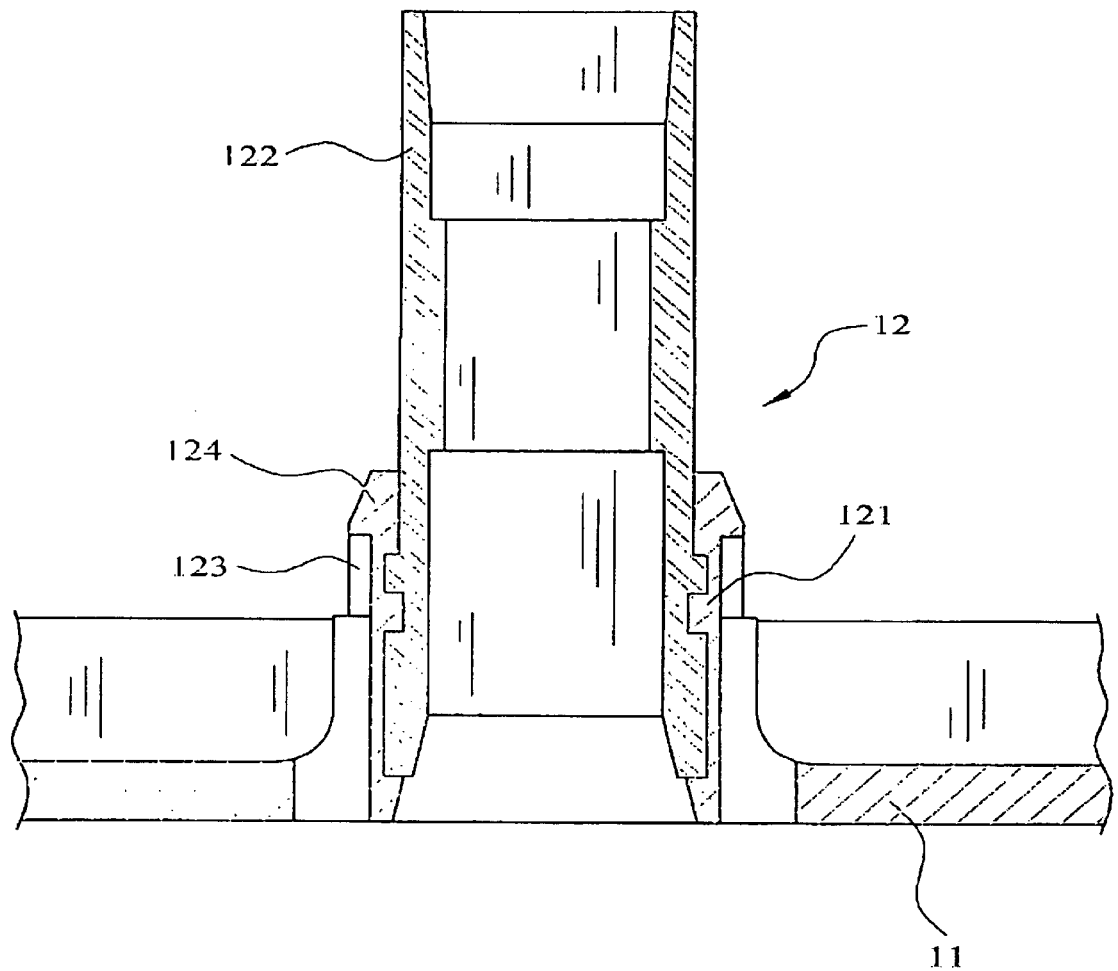
FIG. 2 shows a cross sectional view of the bearing of the present invention.
Figure 3:
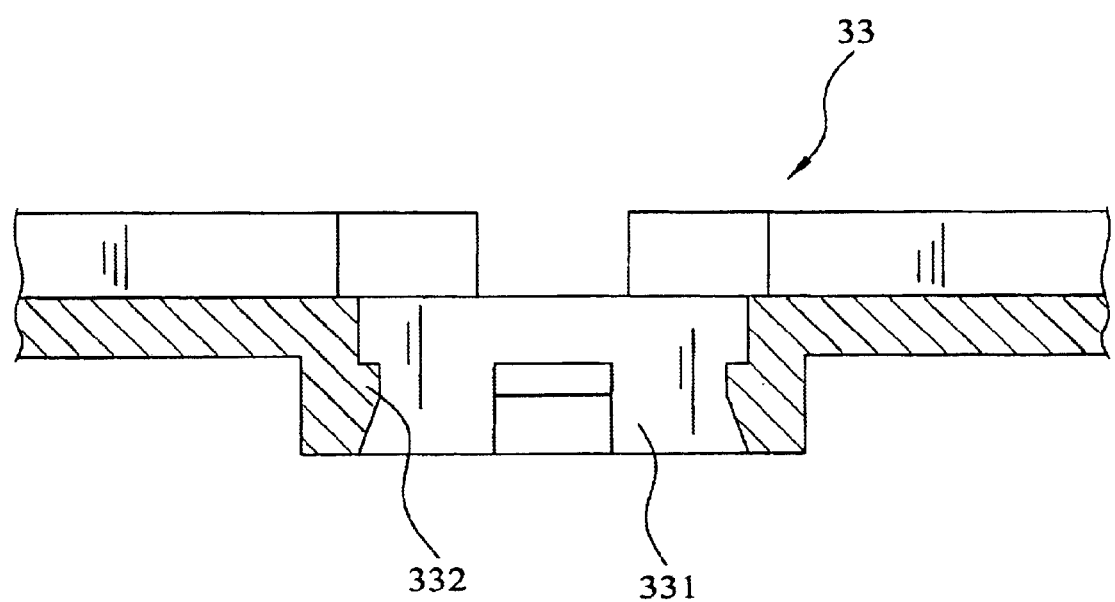
FIG. 3 shows a cross sectional view of the lower bobbin of the present invention.

FIG. 1, FIG. 2, and FIG. 3 respectively show a separation view of the present invention, a cross-section view of the bearing of the present invention, and a cross-section view of the lower bobbin of the present invention. As shown in the drawings, the present invention provides a metal bushing motor to fix a fan. The fan includes a frame body 1, a circuit board 2, a stator assembly 3, and a rotor assembly 4. By the present invention, a stator assembly 3 is firmly mounted on the frame body 1, rather than get loose or fall off to interrupt the rotation operation of the fan while being forced or operated for a certain period.

A base 11 is disposed in the center of the frame body 1 mentioned above and a bearing 12 is disposed on the base 11. The bearing 12 on the base 11 is composed of a connection part 121 and a hollow tube 122. The connection part 121 protrudes out of the center of the base 11 in one-piece design, and at least one joint part 123 is disposed on outer circumference of the connection part 121. The joint part 123 is a recess, and inner face of the recess is to set up a protruding portion 124 in one end.

The circuit board 2 is allocated on the base 11 of the frame body 1. The stator assembly 3 is composed of a silicon steel assembly 32, an upper bobbin 31 and a lower bobbin 33 disposed on two sides of the silicon steel assembly 32. By a bore 321 disposed in the center of the silicon steel assembly 32, the stator assembly 3 disposed on the outside of the bearing 12 on the base 11 electronically connects to the circuit board 2. Moreover, a lower bobbin 33 is mounted on the button of the stator assembly 3. A hole 331 corresponding to the bore 321 in the center of the silicon steel assembly 32 is disposed in the center of the lower bobbin 33, and at least one obstructer 332 corresponding to said joint part 123 mounted on said bearing 12 is disposed on inner circumference of the hole 331. The obstructer 332 could be a hook.

The rotor assembly 4 is composed of a blade 41, a magnetic lasso 42 circularly disposed on the inside the blade 41, and an axis 43 pivoted on the center of the blade 41. By the axis 43, the rotor assembly 4 is set on the outside of the bearing 12 on the base 11 and the magnetic lasso 42 corresponds to the outside of the silicon stainless assembly 32. In the novel structure of metal bushing motor of the present invention, by the lower bobbin 33, the stator assembly 3 is firmly mounted on the bearing 12 of the base 11, rather than get loose or fall off to interrupt the rotation operation of the fan while being forced or operated for a certain period.

Figure 4:
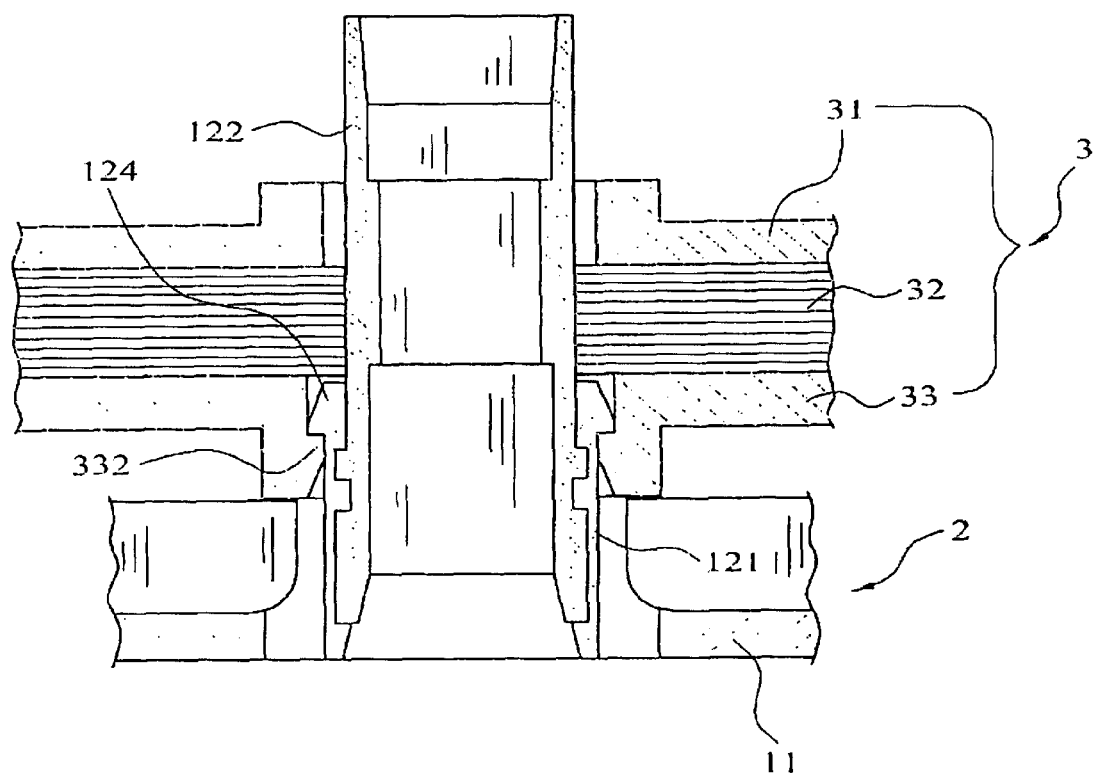
FIG. 4 shows a cross sectional view in combination configuration of the present invention.

FIG. 4 shows a cross-section view in combination configuration of the present invention. As shown in the drawing, when the stator assembly 3 of the present invention is connected with the bearing 12 of the frame body 1, the hole 311 of the lower bobbin 33 disposed on the button of the stator assembly 3 corresponds with the central bore 321 of the lower bobbin 33 and the silicon steel assembly 32 on the bearing 12 in the center of the frame body 1. Then, the stator assembly 3 along with the lower bobbin 33 is forced to mount the lower bobbin 33 on the bearing 12. The obstructer 332 on inner circumference of the hole 331 is mounted on the connection part 121 of the bearing 12 of the frame body 1. The protruding portion 124 engages the obstructer 332 when the bearing 12 is inserted into the joint 123 that is a recess. Since the obstructer 332 is a hook, when the obstructer 332 is disposed in the joint part 123, by the cooperation of the protruding portion 124 and the obstructer 332, the bearing 12 can come into a lock configuration. Thus, the stator assembly 3 is mounted on the bearing 12 of the frame body 1. After being mounted, the obstructer 332 is limited in the joint part 123. The obstructer 332 is a hook. Therefore, the stator assembly 3 cannot be pulled upward with the obstructer of the protruding portion 124. Furthermore, the stator assembly 3 cannot turn left or right the obstruction of two sides of the joint part 123. Therefore, by the lower bobbin 33, the present invention can firmly mount the stator assembly 3 on the bearing 12 of the base 11, rather than get loose or fall off to interrupt the rotation operation of the fan while being forced or operated for a certain period.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed is:

1. A metal bushing motor for a fan comprising:
   a) a frame body having:
      i) a base located in a center of the frame body; and
      ii) a bearing located on the base and having at least one joint part and a protruding portion located on an exterior thereof;
   b) a circuit board located on the base;
   c) a stator assembly located on the bearing and having:
      i) a silicon steel assembly;
      ii) an upper bobbin located on a first surface of the silicon steel assembly; and
      iii) a lower bobbin located on a second surface of the silicon steel assembly and having a hole and at least one obstructor located on a periphery of the hole and inserted into the at least one joint part of the bearing, one of the at least one obstructor engaging the protruding portion of the bearing and connecting the stator assembly to the bearing; and
   d) a rotor assembly connected to the bearing and having:
      i) a blade;
      ii) a magnetic lasso located on an interior of the blade and corresponding with an outer periphery of the silicon steel assembly; and
      iii) an axile protruding from a center of the blade.

2. The according to claim 1, wherein the bearing includes a connection part and a hollow tube connected to the connection part, the at least one joint part and a protruding portion are located on the connection part.

3. The according to claim 2, wherein the connection part and the hollow tube are integrally made.

4. The according to claim 1, wherein the axile of the rotor assembly is inserted into a hollow tube of the bearing.

5. The according to claim 1, wherein each of the at least one joint part is a recess.

6. The according to claim 1, wherein each of the at least one obstructor is a hook.

* * * * *